US007354648B2

(12) United States Patent
Bate

(10) Patent No.: US 7,354,648 B2
(45) Date of Patent: Apr. 8, 2008

(54) ELECTRICALLY CONDUCTIVE NON-STICK COATING

(75) Inventor: Thomas J. Bate, Glenview, IL (US)

(73) Assignee: Akzo Nobel Non-Stick Coatings, Des Plaines, IL (US)

( * ) Notice: Subject to any disclaimer, the term of this patent is extended or adjusted under 35 U.S.C. 154(b) by 421 days.

(21) Appl. No.: 10/958,097

(22) Filed: Oct. 4, 2004

(65) Prior Publication Data

US 2005/0137308 A1 Jun. 23, 2005

(51) Int. Cl.

| | |
|---|---|
| ***B32B 27/02*** | (2006.01) |
| ***B32B 27/28*** | (2006.01) |
| ***B32B 27/14*** | (2006.01) |
| ***B32C 27/12*** | (2006.01) |
| ***C08L 23/00*** | (2006.01) |

(52) U.S. Cl. ...................... 428/421; 428/357; 428/389; 428/323; 428/363; 428/402; 428/404; 428/353; 252/500; 252/511; 252/518.1; 430/311; 430/201; 430/110.3; 430/527; 399/159; 347/105; 347/106

(58) Field of Classification Search ................ 252/500, 252/511, 518.1; 428/357, 389, 323, 363, 428/364, 402, 403, 404; 106/455, 491, 417, 106/425, 430

See application file for complete search history.

(56) References Cited

U.S. PATENT DOCUMENTS 4,914,146 A 4/1990 Honda et al.
5,376,307 A * 12/1994 Hagiwara et al. ...... 252/519.33
5,667,846 A 9/1997 Thomas
5,667,891 A * 9/1997 Batzar et al. ............... 428/389
6,133,359 A 10/2000 Bate et al.
6,248,806 B1 * 6/2001 Codolar et al. ............. 523/177
7,087,351 B2 * 8/2006 Aylward et al. .............. 430/20

FOREIGN PATENT DOCUMENTS

CN 1195683 A 4/1997

OTHER PUBLICATIONS

Wypych, "Handbook of Fillers," 2nd Edition, Plastic Design Library. 2000, pp. 107,112,788.*
International Search Report for PCT/US04/32486 issued Feb. 10, 2005.

* cited by examiner

*Primary Examiner*—Stanley S. Silverman
*Assistant Examiner*—Kallambella Vijayakumar
(74) *Attorney, Agent, or Firm*—Brinks Hofer Gilson & Lione

(57) ABSTRACT

A non-stick coating includes fluoropolymer and electrically conductive mica. The coating may be used on rollers in printing machines to help dissipate static electricity.

6 Claims, No Drawings

ELECTRICALLY CONDUCTIVE NON-STICK COATING

BACKGROUND OF THE INVENTION

Modern printing machines generally contain a heated fuser roller and an opposing pressure roller. As paper is fed between the rollers, the heated fuser roller melts (i.e., fuses) toner onto the paper to form the desired image. The pressure roller applies sufficient pressure to the paper to allow it to touch the fuser roller and have the image applied to it. The fuser roller typically consists of a steel or aluminum core. The pressure roller typically also consists of a steel or aluminum core, but further includes a flexible rubber coating that can bend and adapt to the topographical features of the fuser roller and paper Rollers in copiers and printers can built up a static charge that compromises image quality and printing speed. Static electricity can be particularly problematic with fuser rollers. For this reason, it is sometimes desirable for a non-stick coating on a roller to be electrically conductive and have the ability to dissipate static electricity. Prior coatings were commonly made conductive by including carbon black. Such coatings, however, may include such a large volume of carbon black that the carbon black compromises the non-stick characteristics of the coating and limits the ability to have a conductive non-stick coating that is any color other than black. An improved conductive non-stick coating is therefore desired.

BRIEF SUMMARY OF THE INVENTION

The non-stick coating of the present invention includes fluoropolymer and electrically conductive mica.

A method of dissipating static electricity in a printing machine roller is also provided. The method comprises the steps of providing a printing machine roller, coating the printing machine roller with a non-stick coating that includes fluoropolymer and electrically conductive mica, curing the coating on the printing machine roller, and installing the printing machine roller in the printing machine.

DETAILED DESCRIPTION OF THE PREFERRED EMBODIMENTS

The non-stick coating of the present invention may be used to coat a substrate of any desired hardness. The type of substrate to which the coating is applied does not limit the scope of the invention. In one embodiment, the non-stick coating of the present invention is used to coat a roller for use in a printing machine, such as a high-speed digital copier or printer. The roller may be a pressure roller or a fuser roller. Most preferably, the coating of the present invention is used to coat a fuser roller. As used herein, "roller" refers generally to pressure rollers, fuser rollers, and the like, unless specifically stated otherwise.

The non-stick coating of the present invention may be applied as a one-coat system or as part of a multi-coat system. By way of example, a multi-coat system may consist of a base coat and a top coat. Alternatively, one or more intermediate coatings may be applied between the base coat and the top coat. In a preferred embodiment, the non-stick coating of the present invention is applied as the top coat in a two-coat system. The non-stick coatings of the present invention can be used, however, as any one of the coats in a multi-coat system.

The non-stick coatings of the present invention include electrically conductive mica. "Electrically conductive mica" is mica that has been treated to create an electrically conductive material. Examples of electrically conductive mica include, but are not limited to, mica that has been coated with conductive metals, conductive metal oxides, conductive polymers, and/or materials that contain conductive metals, metal oxides and/or polymers. Exemplary, non-limiting examples of metal oxides that can be used to coat the mica are indium oxide, tin antimony oxide, titanium dioxide, and/or tin dioxide. Preferably, the mica that is coated is in flat, platelet form. The mica may be natural or synthetic. The preferred electrically conductive mica comprises flat platelets of mica coated with tin antimony oxide (tin oxide doped with antimony) and is commercially available from EM Industries, Inc. under the trade name MINATEC 40CM.

As discussed above, it is preferred that the coated mica is in platelet form. Alternatively, the mica may be in the form of long fibers. An exemplary fibrous electrically conductive mica is 3M Metal Coated Particles SD220 which is commercially available from 3M Corporation. When fibrous mica is incorporated in a non-stick coating, the long strands of mica may extend out of the coating. If the coating containing the fibrous mica is a base or intermediate coat, the fibrous mica may reach into adjacent coating(s). It is preferred that fibrous mica is used in a base coat or intermediate coat to create a conductive bridge between and within different layers. This conductive bridge enhances the ability of a multi-coat system to dissipate static electricity. A base coat or intermediate coat that includes fibrous electrically conductive mica is preferably used with a top coat that includes electrically conductive mica in platelet form.

Fibrous conductive mica is also useful in a base or intermediate coat where a particular overall color is desired for the multi-coat system. Carbon black is commonly used in base or intermediate coats, but, in situations where the base or intermediate coats include carbon black, the overall color of the coating is generally also black because the deep black color of the carbon black dominates the presence of any other colors. Use of fibrous conductive mica instead of carbon black enables different colored coatings (i.e. coatings that are not black) because the fibrous conductive mica does not dominate the color of the coating to the same extent as carbon black. As a result, the benefit of non-black pigments may be fully realized in a conductive non-stick coating.

The non-stick coatings of the present invention may include one or more different electrically conductive micas. The particle size of the electrically conductive mica should be the size that is appropriate for the particular application. The particle size of electrically conductive mica in platelet form is preferably about 1 to 20 microns, and most preferably about 5 to 10 microns. An appropriate amount of electrically conductive mica should be used for the particular application. Generally, the preferred amount of electrically conductive mica is about 0.1% to 10% by weight, preferably about 0.5 to 5% by weight, and most preferably about 1% by weight. In general, the amount of electrically conductive mica that is required for a particular application occupies less volume in the coating and facilitates better release and color characteristics for the coating than prior conductive pigments such as carbon black. As used herein, weight percentages are expressed as a percent of the wet coating formulation.

The non-stick coating of the present invention includes fluoropolymer. The fluoropolymer is responsible for the non-stick quality of the coating. There are myriad commercially available fluoropolymers and the specific fluoropolymer chosen does not limit the scope of the present invention. The fluoropolymer component of the present invention may include a single type of fluoropolymer, or may include a mixture or blend of more than one type of fluoropolymer. The fluoropolymer may be a micropowder or a dispersion of fluoropolymer in water. By "dispersion" it is meant that the fluoropolymer particles are stably dispersed in water so that the particles do not settle before the dispersion is used. In some cases it may be desirable to include an organic solvent, such as n-methylpyrrolidone, butyrolactone, high boiling aromatic solvents, alcohols, or mixtures thereof. The fluoropolymer used in the coating of the present invention is preferably provided a dispersion.

Exemplary fluoropolymers are tetrafluoroethylene-perfluoromethyl vinyl ether copolymer (MFA), tetrafluoroethylene-hexafluoropropylene copolymer (FEP), and polytetrafluoroethylene (PTFE). Non-limiting examples of other acceptable fluoropolymers are polychloro-trifluoroethylene (PCTFE), ethylene-chlorotrifluoroethylene copolymer (ECTFE), ethylene-tetrafluoroethylene copolymer (ETFE), tetrafluoroethylene (TFE) and perfluoro (ethyl vinyl ether) (PEVE) copolymer (PFA), TFE and perfluoro (propyl vinyl ether) (PPVE) copolymer (PFA), polyvinylfluoride (PVF), and polyvinylidene fluoride (PVDF). The fluoropolymer component may also include comonomer modifiers that improve selected characteristics.

PTFE and PFA are the preferred fluoropolymers. The preferred PTFE is commercially available as a dispersion from Daikin America, Inc. and sold under the trade name DAIKIN-POLYFLON. The preferred PFA is commercially available as a dispersion from 3M and sold under the trade name DYNEON PFA 6900 N.

The coating of the present invention may include an acrylic polymer. Useful acrylic polymers include polymers and copolymers of esters of acrylic acid and methacrylic acid, such as methyl acrylate, methyl methacrylate, ethyl acrylate, ethyl methacrylate, propyl acrylate, propyl methacrylate, butyl acrylate, butyl methacrylate, and similar monomers. One or more different acrylic polymers may be combined for use in the coating formulations of the present invention. A preferred acrylic polymer is commercially available from Zeneca, Inc. under the trade name NEOCRYL BT 44

The wet non-stick coating formulation of the present invention can be sprayed onto a substrate, such as a steel or aluminum fuser roller in a printing machine, by conventional or high volume, low pressure (HVLP) methods. The substrate may already include one or more coatings. The thickness of any existing coatings is preferably less than 10 microns. The coating of the present invention is applied to the substrate and is preferably cured for 5 minutes at 820° F.

The solvent system and the drying time used with the coating of the present invention are preferably chosen so that the time to cure the coating is sufficiently long for the mica particles to orient themselves. For example, if the electrically conductive mica comprises flat platelets of coated mica, it is preferred that the coating is cured for a time that is long enough for the platelets of mica to orient themselves in a generally horizontal relationship with respect to the substrate. The thickness of the coating of the present invention after it has been cured is preferably about 5 to about 15 microns, most preferably about 10 microns.

In a preferred embodiment, the coating is applied to a fuser roller for use in a printing machine. The conductive, non-stick coating on the installed fuser roller helps dissipate static charge that may build up during operation of the printing machine.

The invention will now be described in more detail with reference the following examples.

EXAMPLE 1

A coating formulation made in accordance with the present invention comprises 63.5% PTFE dispersion, 12.7% acrylic resin, 4.75% electrically conductive mica, 4.4% PFA dispersion, 4.04% triethanolamine, 1.09% butyl carbitol, and 1.09% of a 12% cerium octoate solution, and 1.1% nonionic surfactant (TRITON X-100, commercially available from Union Carbide Inc.). The balance of the formulation is water and additives. Each additive comprises less than 2% of the composition. The additives include well known defoamers, flow agents, dispersants, surfactants, stabilizers, thickeners, pigments, and/or fillers.

The exemplary coating described above is made as follows. 748 pounds of PTFE dispersion is added to 52 pounds of PFA dispersion and mixed for three minutes. The following solvents are mixed at high speed for 3-5 minutes and slowly added to the fluoropolymer dispersion mixture: 13 pounds of butyl carbitol, 15 pounds of Aromatic 150 (aromatic hydrocarbon mixture, CAS #64742-94-5), 47 pounds of triethanolamine, 13 pounds of Emersol 221 (oleic acid, CAS #112-80-1), 14 pounds of TRITON X-100, and 13 pounds of a 12% cerium octoate solution. 150 pounds of acrylic resin (NEOCRYL BT 44, commercially available from Zeneca Inc.) and 56 pounds of water are added and the mixture is mixed at low speed for 15 minutes. 56 pounds of electrically conductive mica are added and the mixture is put through a filter rated at 75 microns.

The wet non-stick coating formulation can be sprayed onto a substrate, such as a steel or aluminum fuser roller in a printing machine, by conventional or high volume, low pressure (HVLP) methods. The coating is preferably cured for 5 minutes at 820° F.

EXAMPLE 2

A coating formulation made in accordance with the present invention comprises 61.7% polytetrafluoroethylene dispersion, 5.3% electrically conductive mica pigment, 3.8% triethylene glycol, 2.8% xylene, 2.0% propylene glycol, 0.2% silicone free defoamer, and 0.1% fluorosurfactant. The balance of the formulation is water and additives. Each additive comprises less than 2% of the composition. The additives include well known defoamers, flow agents, dispersants, surfactants, stabilizers, thickeners, pigments, and/or fillers.

The exemplary coating described above is made as follows. 221 pounds of water are mixed with 2 pounds of a silicone free defoamer. To this mixture is added a mixture of 44 pounds of triethylene glycol, 11 pounds of nonionic surfactant, 5 pounds of ethoxylated surfactant, and 0.5 pounds of a flow agent. The resultant mixture is mixed at high speed for three minutes. 33 pounds of xylene and 61 pounds of electrically conductive mica are added and mixed for 5 minutes. 24 pounds of blue pigment and 24 pounds of propylene glycol are ground together and added to the mixture. 718 pounds of a polytetrafluoroethelyene dispersion, 7 pounds of white pigment, 0.5 pounds of flow agent and 2 pounds of surfactant are then added to the mixture Thickener is added to adjust the viscosity. The formulation is filtered through a mesh filter rated at 75 microns.

A preferred silicone free defoamer is commercially available from Troy Corporation under the trade name TROYKYD D999. A preferred ethoxylated surfactant is available from Air Products Corp. under the trade name SURFYNOL 440. A preferred fluorosurfactant is commercially available from 3M under the trade name FLUORAD FC129. A preferred dispersant is an acetylene diol dispersant that is commercially available from Air Products and Chemicals, Inc. under the trade name SURFYNOL 104BC. The remaining components are staple chemicals that are widely known and available.

The wet non-stick coating formulation can be sprayed onto a substrate, such as a steel or aluminum fuser roller in a printing machine, by conventional or high volume, low pressure (HVLP) methods. The coating is preferably cured for 5 minutes at 820° F.

While particular embodiments of the present invention have been illustrated and described above, the present invention should not be limited to such examples and descriptions. It should be apparent that changes and modifications may be incorporated and embodied as part of the present invention within the scope of the following claims.

The invention claimed is:

1. A roller for use in a printing machine, the roller comprising a first coating and second coating, the first coating including fluoropolymer and fibers of electrically conductive mica, the second coating being located above the first coating and including fluoropolymer and platelets of electrically conductive mica.

2. The roller of claim 1, wherein the color of the first and second coatings is not black.

3. The roller of claim 1, wherein the color of the roller is not black.

4. The roller of claim 1, wherein the first coating and the second coating do not include carbon black.

5. A method of dissipating static electricity in a printing machine roller, the method comprising the following steps:

a. providing a printing machine roller;

b. coating the printing machine roller with a first coating and second coating, the first coating including fluoropolymer and fibers of electrically conductive mica, the second coating being located above the first coating and including fluoropolymer and platelets of electrically conductive mica;

c. curing the first and second coatings on the printing machine roller; and, d. installing the printing machine roller in a printing machine.

6. The method of claim 5, wherein the printing machine roller is a fuser roller.

* * * * *